No. 706,568. Patented Aug. 12, 1902.
C. W. KENNEDY.
ELECTRODE FOR STORAGE BATTERIES.
(Application filed July 30, 1901.)
(No Model.) 2 Sheets—Sheet 1.
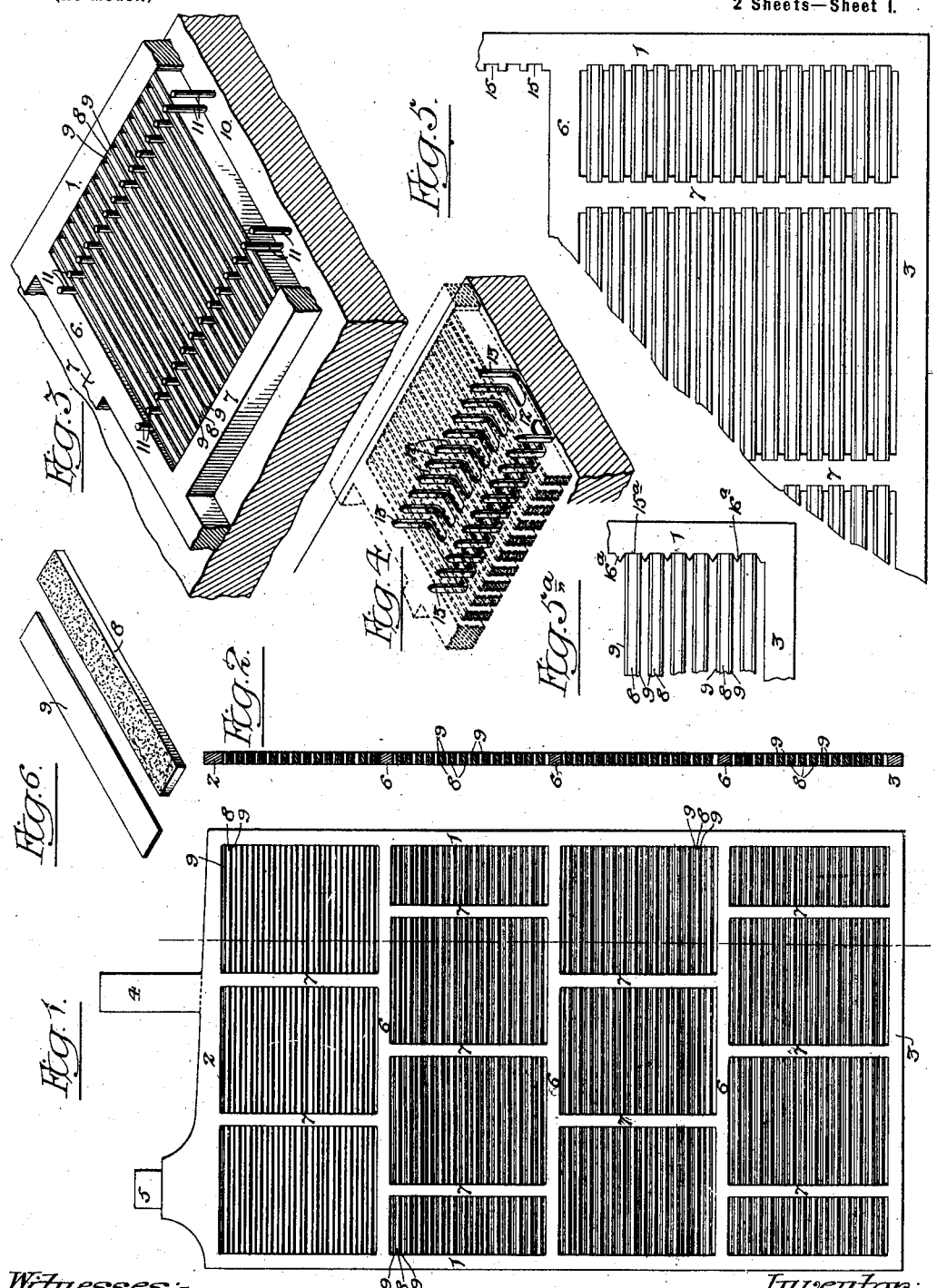
Witnesses:
Inventor:—
Charles W. Kennedy
by his Attorneys:—
Howson & Howson No. 706,568. Patented Aug. 12, 1902.
C. W. KENNEDY.
ELECTRODE FOR STORAGE BATTERIES.
(Application filed July 30, 1901.)
(No Model.) 2 Sheets—Sheet 2.
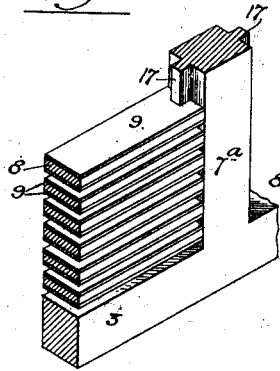
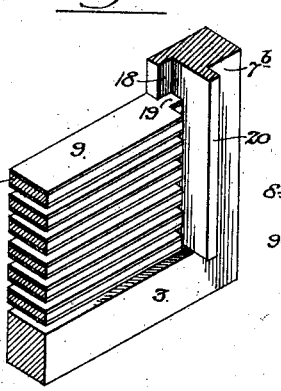
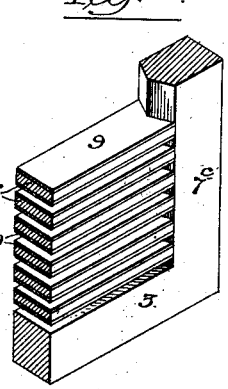
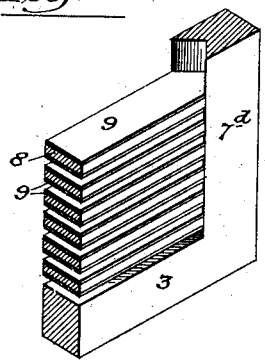
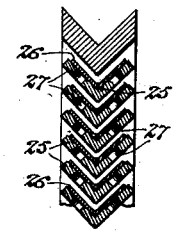
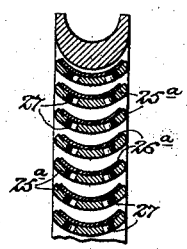
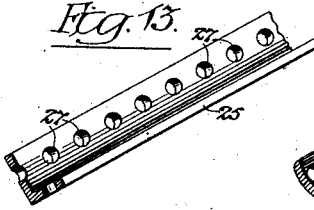
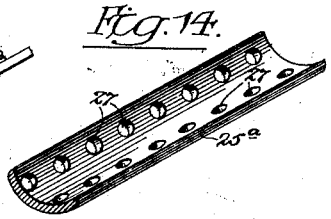
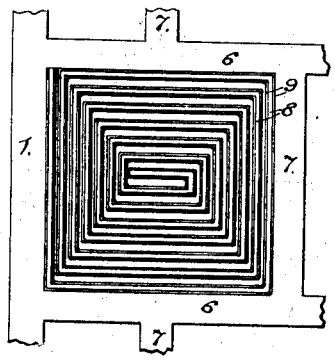
Witnesses:—
Louis M. L. Whitehead
Murray C. Boyer
Inventor:—
Charles W. Kennedy
by his Attorneys:—
Howson & Howson

UNITED STATES PATENT OFFICE.

CHARLES W. KENNEDY, OF RUTLEDGE, PENNSYLVANIA.

ELECTRODE FOR STORAGE BATTERIES.

SPECIFICATION forming part of Letters Patent No. 706,568, dated August 12, 1902.

Application filed July 30, 1901. Serial No. 70,240. (No model.)

*To all whom it may concern:*

Be it known that I, CHARLES W. KENNEDY, a citizen of the United States, and a resident of Rutledge, Delaware county, Pennsylvania, have invented certain Improvements in Electrodes for Storage Batteries, of which the following is a specification.

My invention relates to that class of electrodes for secondary or storage batteries in which the active material is formed or deposited directly upon the lead plate by electrochemical action, and more particularly to the form of such electrodes shown in my Patents No. 629,260, July 1, 1899, and No. 630,714, August 8, 1899.

My present invention consists of certain improvements in such electrodes, whereby I can increase the amount of active surface, insure greater efficiency, and at the same time distribute or take up the expansion occuring during the "forming" period, providing a plate in which the "formed" active material will be positively supported.

My invention also includes certain means for perfecting mechanically any partially-formed plates produced by electrochemical action, and it further includes certain means for positioning and securing together the various parts of the plate before such plate is put into the forming-bath.

Other details of my invention will be pointed out hereinafter, reference being had to the accompanying drawings, in which—

Figure 1 is a front elevation of the improved form of electrode made in accordance with my invention. Fig. 2 is a vertical sectional view of the same, taken on the line $a$ $a$, Fig. 1. Fig. 3 is a perspective view, on an enlarged scale, of a portion of the electrode, illustrating one method of positioning the lead strips in the inclosing frame. Fig. 4 is a view similar to Fig. 3, showing a modification of one of the details thereof. Fig. 5 is a front elevation, on an enlarged scale, of a portion of an electrode made in accordance with my invention, having a frame specially formed to receive and position the lead strips. Fig. 5ª is a modification of the frame shown in Fig. 5. Fig. 6 is a perspective view of the lead strips used to form the active material of my improved electrode. Figs. 7, 8, 9, and 10 are perspective views of a portion of the electrode, illustrating modified forms of the lead strips. Figs. 11 and 12 are enlarged sectional views of a portion of the electrode, illustrating still further modifications in the form of the lead strips. Figs. 13 and 14 are perspective views of the form of strips shown in Figs. 11 and 12, and Fig. 15 is a view of a portion of an electrode in which continuous lead strips are used to form the active material.

As in my former patents, the object of my present invention is to provide an electrode of the character described which shall have a maximum amount of active surface and a minimum amount of weight.

A further object is to so construct the frame of the plate that the expansion due to the formation of the active material will be taken up by said plate without danger of buckling or warping, the lead strips, which are oxidized to form the active material, being horizontally disposed within said frame and expanding when forming in a vertical direction. The lead frame, as made in accordance with this invention, is specially shaped to resist strain in this direction due to the expansion of the active material.

In the accompanying drawings the frame of the electrode, which is rectangular in form, consists of the side pieces 1 and the top and bottom pieces 2 and 3. The top piece 2 is provided with suitable projections 4 and 5, by which connection may be made with other electrodes during the forming period and when assembling the same in a battery. Extending across the frame and connecting the side pieces 1 are the cross-bars 6, which are connected to each other and to the top and bottom pieces 2 and 3 by means of the vertical members 7. These members "break joint," so to speak, with each other—that is to say, the members connecting the upper cross-bar 6 with the top piece 2 are spaced apart equidistantly between the side pieces 1, while the next set of connecting-pieces 7 are disposed opposite the center of the space between those of the first set, and so on throughout the plate. The plate so made is preferably integral, and may be cast or stamped out of sheet metal, as may be most convenient.

Within each space or recess of the frame of the electrode formed by the cross-bars 6 and the vertical members 7 I arrange the lead strips forming the active material. In the present instance these strips are arranged in sets or groups of three—viz., the supporting-strip 8, roughened, knurled, or corrugated, so as to provide a retaining-surface for the peroxid of lead formed by electrochemical action, and the strips or films 9, disposed on either side of the strips 8. The strips or films 9 are perfectly smooth and are considerably thinner than the strips 8. They are kept in contact with the strips 8 during the building up of the electrode, and during the forming process these thin strips or films are reduced to peroxid of lead, which deposits upon the lead strips 8.

The strips 8 are comparatively thick, and while the strips or films 9 are entirely reduced by the forming operation only the surface of the strips 8 will be acted upon by the oxidizing solution, leaving a sufficient portion of said strips 8 to serve as a support for the peroxid formed by the decomposition of the strips or films 9 and the surface of said strips 8. In the drawings herewith I have shown and in the specification I have described single strips or films 9, combined with the supporting-strips 8. It will be understood, however, that I may use a series of such thin strips or films interposed between the supporting-strips, such strips or films rendered active by the electrochemical action above referred to.

As before noted, the strips 8 and the films 9 are arranged in sets or groups and fitted in the recesses of the electrode-frame, and after they are fitted in place they may be held in position by bending over a portion of the plate in contact with the ends of the same or by burning said ends, and thereby fusing them with the frame of the electrode.

In order to position the strips within the recesses of the frame and provide sufficient space for expansion during the forming period, I provide the means shown in Fig. 3, which comprises a base-board or support 10, upon which the frame of the electrode may be secured by any suitable means, having pins 11 secured thereto, said pins being spaced apart the necessary distance and adapted to confine between them the groups or sets of the strips 8 and 9 hereinbefore referred to, while they are being fused or otherwise secured to the frame of the electrode.

In Fig. 4 I have shown another form of spacing device for positioning the lead strips within the frame, such device comprising a member 12, having upwardly-projecting prongs 13, between which are formed spaces 14 to receive the sets of strips 8 and 9. The members 12 may be in sections and secured to the base-board, so as to register with the recesses of the frame of the electrode. The base-boards constructed as shown in Figs. 3 and 4 may be used repeatedly for positioning the strips within the frame, such strips being fused in place or otherwise secured as soon as positioned, and the electrode when removed from said base-board will be practically finished and ready for the forming-bath.

In some instances it may be preferable to form the frame of the electrode in such manner that there will be no necessity of using a special support or spacing device to position the sets of lead strips, and in Fig. 5 I have shown a frame of this character having recesses or notches 15, formed or cut in the inner sides of the vertical members 7, such recesses being adapted to receive the ends of the groups of strips 8 and 9. These notches are squared, as shown, and the expansion of the lead strips must be beyond the point of contact with the walls of said notches. In Fig. 5$^a$, however, I have shown a form of notched frame in which the projecting portions 16$^a$ between the notches 15$^a$ are wedge-shaped, and while they serve to confine the groups of strips in place they will not interfere with the expansion that takes place during the forming period.

In Fig. 6 I have shown a perspective view of the strips 8 and films 9. The strips 8 are roughened, knurled, or corrugated, as noted above, being preferably made in the manner set forth in my former patent, No. 630,714, dated August 8, 1899. The strips or films 9 are very much thinner than the strips 8 and are preferably smooth. During the forming period said strips will be entirely reduced to peroxid of lead.

In Figs. 7, 8, 9, and 10 I have illustrated certain modifications in the shape of the electrode-frame designed for the purpose of retaining the strips 8 and films 9 within said frame without the necessity of fusing said strips to hold them in position. In Fig. 7 the vertical members 7$^a$ of the frame are provided with a rib 17 on the inner face of the same, and the strips 8 and films 9 are notched at the ends to engage said grooves. In Fig. 8 the vertical members 7$^b$ are provided with a groove 18, and the strips 8 and films 9 have projections 19, adapted to rest in said grooves. In making this form of frame I prefer to have a raised edge 20 adjacent to each side of the vertical members 7$^b$, and after the strips 8 and 9 have been set in place said raised edge 20 may be flattened down by a hammer or placed in a suitable die and flattened against the projecting ends 19 of the strips 8 and films 9 to hold them in place. In Fig. 9 the vertical members 7$^c$ have the wedge-shaped inner face, and the strips 8 and films 9 have V-shaped cuts in their ends to fit the same. In the form of frame shown in Fig. 10 this shape is reversed, the vertical members 7$^d$ having V-shaped recesses adapted to receive the wedge-shaped ends of the strips 8 and films 9.

The form of strips 8 previously referred to are perfectly flat, and as they are arranged within the frame of the electrode horizontally they serve to support the peroxid formed by the reduction of a portion of the same and the films 9. Should a battery of this construction be subjected to violent movement, however, such as might be occasioned by use with vehicles, there would be great danger of the peroxid becoming detached from the strips 8 and consequently lost, thereby greatly reducing the efficiency of the battery. In order, therefore, to provide an electrode of the broad character devised by me for use in connection with vehicles, I propose the use of such a strip as is shown in Figs. 11 and 12. In Fig. 11 I have shown a sectional view of a portion of an electrode made in accordance with this modification in which trough-like strips 25 are used, supporting thinner trough-like films 26, said films being reduced to peroxid of lead during the forming period. The strips 25 are considerably heavier than the films 26 and are made of the roughened, knurled, or corrugated metal, hereinbefore referred to. These strips are perforated at 27 for the free passage of the electrolyte. This trough-like strip is shown in perspective at Fig. 13. In Fig. 12 I have shown a modified form of the strips shown in Fig. 11, the modification being semicircular in cross-section, as shown at 25ª, supporting the thinner films 26ª, also semicircular in cross-section. This form of strip is shown in perspective view in Fig. 14, and, as in the form of strip illustrated in Figs. 11 and 13, is perforated at 27.

In the forms of strips shown in Figs. 7 to 10, inclusive, there will be, under ordinary circumstances, no necessity of fusing the same with the frame of the electrode, although in some instances I may prefer to do so. They are disposed within the spaces of said frame in such number that sufficient room is left between the same to allow for the expansion during the forming period.

The strips shown in Figs. 11 to 14, inclusive, are also arranged with just sufficient space between the same to allow for the expansion; but in this form of electrode it will probably be necessary to fuse the strips in the frame. In this form of electrode the horizontal bars of the frame should be of a cross-section corresponding to the shape of the strips 25 and 25ª.

In Fig. 15 I have shown a portion of an electrode in which the material to become active is in the shape of continuous lead strips 8 and 9, arranged in a rectangular coil. These strips are spaced apart a suitable distance to allow for expansion, and the spaces between the horizontal runs of the coil are preferably wider than the spaces between the vertical runs. The adjoining corners of the different runs of the strip may be soldered together, if desired, although this is not necessary, as the recess of the electrode will be entirely filled by the peroxid of lead during the forming period, and when assembled in a battery the separators will act to support such active material in said recesses.

In most instances plates made in accordance with my invention will have solid masses of the active material disposed within the recesses of the frame after the forming operation. In practice, however, it will be found that some of the plates will not entirely fill up with the peroxid of lead, and spaces being left between the lead strips the plate will have considerably less efficiency than one having solid masses of the active material. Such defective plates may be improved and rendered practically perfect by coating or pasting the recesses or apertures unfilled with the peroxid of lead with the ordinary red lead or litharge used in the manufacture of what are termed "pasted" electrodes. After this operation the plate, having been entirely filled with active material, is ready for use. I prefer, however, that such plates shall have their active material formed entirely electrochemically.

Having thus described my invention, I claim and desire to secure by Letters Patent—

1. As a new article of manufacture, a grid for storage-battery electrodes comprising a frame provided with recesses to receive the material to become active and having series of horizontal and vertical members forming said recesses, each of said vertical members being disposed opposite one or more of said recesses and serving to resist the pressure caused by the expansion of the active material during the "forming" period.

2. As a new article of manufacture, a grid for storage-battery electrodes comprising a frame provided with recesses to receive the material to become active, a series of horizontal cross-bars carried by said frame, and a series of vertical connecting-pieces forming with said cross-bars, the recesses for the active material, each series of vertical pieces being so disposed that those of no two adjacent series are directly opposite each other, substantially as and for the purpose set forth.

3. As a new article of manufacture, an electrode for storage batteries comprising a frame provided with recesses to receive the material to become active, horizontally-disposed strips forming the material to become active arranged in said recesses and spaced apart to permit expansion, and horizontal bars and vertical pieces connected with the frame and forming said recesses, said vertical pieces being arranged opposite the spaces adapted to contain the masses of active material and serving to resist the pressure due to the expansion of the same when "forming."

4. As a new article of manufacture, an electrode for storage batteries comprising a frame having recesses for the reception of the material to become active, horizontal and vertical members carried by said frame and forming said recesses, the vertical members being disposed opposite the spaces above and below the same, horizontally-disposed lead strips arranged in said spaces and forming the material to become active, and means carried by the vertical members whereby said strips may be retained in position within the frame, but free to expand during the "forming" period.

5. As a new article of manufacture, an electrode for storage batteries, comprising a frame having recesses for the reception of the material to become active, and lead strips arranged in sets or groups and forming the material to become active, said strips comprising pieces of different thickness horizontally arranged within the electrode, and so confined therein as to permit expansion during the "forming" period, substantially as described.

6. The combination in an electrode for secondary batteries of the frame having recesses to receive the material to become active, vertical members forming the side walls of said recesses, said members having grooves on their inner sides and projecting portions upon one outer face, and lead strips forming the material to become active and having projections at their ends adapted to the grooves of the vertical members, said strips being held in place by the bending over of the projecting portion of the vertical members of the frame.

7. In combination with an electrode of the character described, a lead strip bent or shaped to form a supporting-trough and adapted to have its surface acted upon by a chemical agent whereby it may be rendered active, and a thinner lead strip capable of being entirely reduced by electrochemical action to form the active material and carried by the bent strip, the walls of said bent strip being perforated for the passage of the electrolyte.

8. Material to become active for use in electrodes wherein such material is rendered active by electrochemical action, comprising strips of lead arranged in series of different thickness and alternating with each other throughout said electrodes, the thinner strips being entirely reduced during the electrochemical action, while the thicker strips, alternating with the same, have only their surface acted upon and serve as a supporting medium for the rest of the active material.

In testimony whereof I have signed my name to this specification in the presence of two subscribing witnesses.

CHARLES W. KENNEDY.

Witnesses:
MURRAY C. BOYER,
JOS. H. KLEIN.